June 22, 1948. R. C. SANDERS, JR., ET AL 2,443,748
AIRCRAFT CONTROL SYSTEM
Filed April 24, 1943
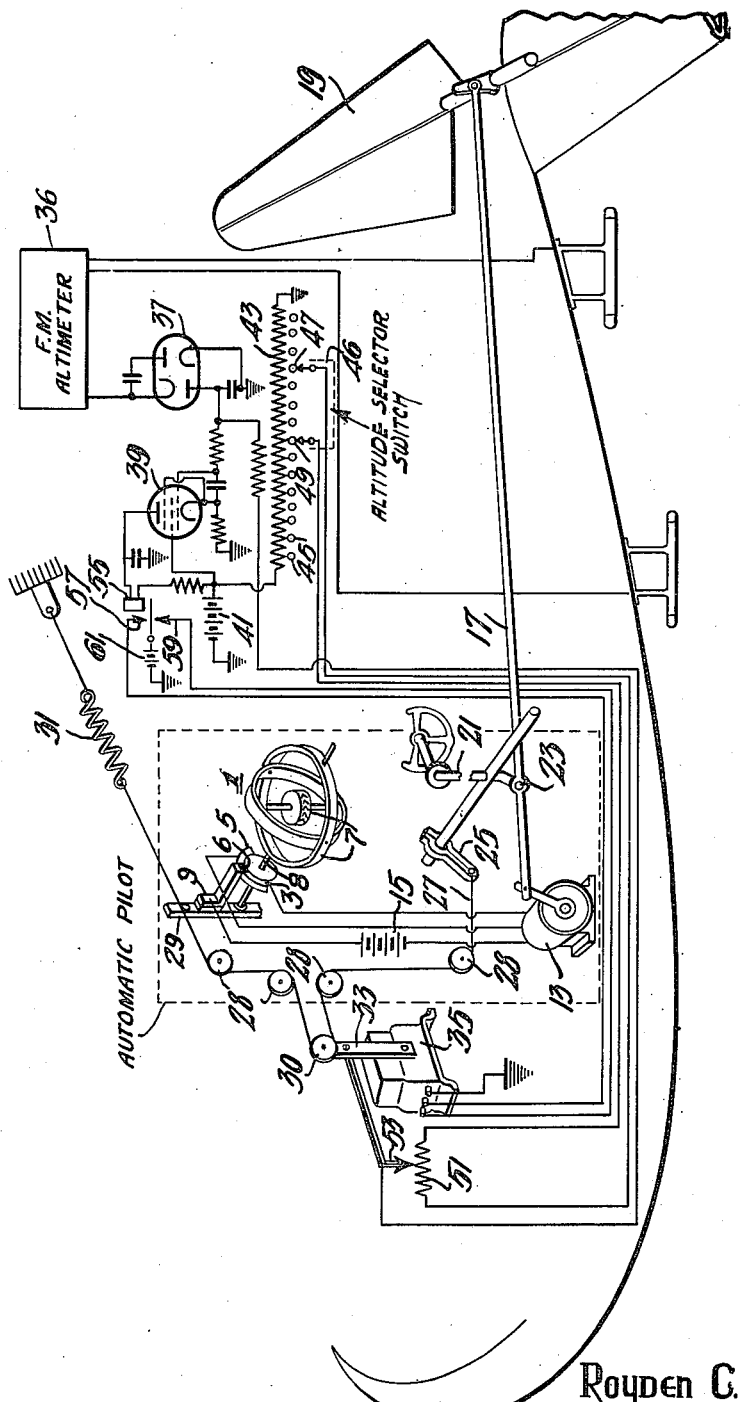
Inventors
Royden C. Sanders Jr.
John H Purl
By &
Attorney Patented June 22, 1948

2,443,748

UNITED STATES PATENT OFFICE 2,443,748

AIRCRAFT CONTROL SYSTEM

Royden C. Sanders, Jr., Hightstown, N. J., and John H. Purl, Philadelphia, Pa.; said Sanders assignor to Radio Corporation of America, a corporation of Delaware Application April 24, 1943, Serial No. 484,458

7 Claims. (Cl. 244—77)

The invention covered herein may be manufactured and used by or for the government of the United States for governmental, military, naval, and national defense purposes without payment to us or assigns of any royalty thereon.

This invention relates to the automatic control of aircraft and more particularly to the control of an automatic pilot or bombing stabilizer by an altimeter, for maintaining a flight at a predetermined or selected altitude. It is proposed to actuate the elevator controls of the craft to cause ascent or descent upon deviation of the craft from a selected level. This may be accomplished by biasing the pitch gyroscope in response to the altimeter as described hereinbelow. In the automatic control of aircraft, the relatively small forces produced by an altimeter must be converted into much larger forces to operate the control surfaces of an airplane. A serious problem which arises in a control system of this type is that of hunting or continuous oscillation of the controlled device about the position which it is intended to assume.

Accordingly it is an object of this invention to provide an improved method of and means for actuating the control surface of an airplane in response to a small control force, such as that provided by an altimeter.

Another object is to provide an improved method of and means for the prevention of hunting.

These and other objects will become apparent to those skilled in the art upon consideration of the following description, with reference to the accompanying drawing, which is a schematic diagram of an embodiment of the invention.

Referring to the drawing, an automatic pilot mechanism of known construction is provided, connected to the control surfaces of an airplane. The automatic pilot includes a longitudinal attitude control gyroscope 1 provided with a gimbal ring 7, carrying two conducting sectors 3 and 5 separated by a small insulating sector 6. A contact 9, engaging the conducting sectors, is supported on a lever 29 adjacent the ring 7. The lever 29 is pivoted on a supporting shaft 8 at a point in the plane of the rotor of the gyroscope 1, so that the contact 9 will be guided in an arcuate path about the sectors 3, 5 and 6. The sectors 3 and 5 are connected to a reversible motor 13, and the contact 9 is connected through a D.-C. source 15 to the motor. The shaft of the motor 13 is mechanically coupled through a linkage 17 to the elevator surfaces 19 of the airplane.

The control stick 21 of the airplane is connected at a pivot 23 to the control linkage, and through an arm 25 to a cable 27. The cable 27 is guided over a plurality of pulleys 28 and a pulley 30 and connected to the lever 29 carrying the contact 9. A spring 31 is provided to maintain the cable 27 under tension. The pulley 30 is supported at the end of a lever 33 secured to the shaft of a reversible motor 35.

Neglecting temporarily the effect of operating the motor 35, the operation of the system thus far described is as follows: The gyroscope 1 tends to maintain a constant attitude, with its rotor in a plane parallel to the surface of the earth. The movable contact 9 normally engages the insulating sector 6. Any deviation of the airplane from level flight will move the contact 9 with respect to the ring 7, and into contact with sector 3 or 5. Thus the motor 13 will be energized so as to run in the proper direction to adjust the control surfaces 19 to cause the airplane to resume its attitude for level flight. In moving to adjust the control surface, the motor 13 also moves the cable 27, rotating the contact 9 with respect to the longitudinal axis of the craft. When the contact 9 reaches the insulated sector 6, the motor is de-energized. During this time the control surface 19 has been bringing the aircraft back toward the position of level flight.

As the airplane continues toward its normal attitude, the contact 9, which has been displaced ahead of the gyroscope, passes the insulated sector and engages the opposite conducting sector, causing the motor 13 to run in the reverse direction. This returns the control surfaces toward the position for level flight. Thus the applied control is removed as the airplane is returning to its normal attitude, so that the control surface will be back in its neutral or central position when the disturbance has been corrected. Briefly a follow-up action has been applied to control the aircraft's attitude as a function of the gyro control. The above described action is typical of any conventional automatic pilot, regardless of the specific means employed for actuating the control surfaces in response to the gyroscope.

In order to maintain flight at a selected level, a radio altimeter such as that described in Civil Aeronautics Bulletin No. 29, on pages 86–90, may be used to actuate the automatic pilot to change the attitude of the airplane when it departs from the selected level, causing it to ascend or descend to the required altitude. An altimeter 36 provides an alternating voltage related in frequency to the distance of the airplane above the ground. This voltage is applied to a frequency responsive relay system comprising an averaging cycle counter 37 and an amplifier 39. The counter 37 provides a unidirectional output voltage. A D.-C. source 41 is connected to a voltage divider 43 provided with a plurality of taps 45. A pair of movable contacts 47 and 49 are arranged to engage selectively predetermined pairs of the contacts 45. The contacts 47 and 49 are mechanically connected as indicated by the dashed line 46, so that they are spaced apart from each other by a distance several times the spacing of the fixed contacts 45. The contacts 47 and 49 are connected to a potentiometer 51 provided with a movable arm 53. The arm 53 is connected to the control grid circuit of the relay amplifier 39 so that the voltage at the potentiometer arm opposes the output of the counter 37. The actuating coil of a relay 55 is connected in the anode circuit of the tube 39. The relay 55 is provided with contacts 57 and 59 which are arranged to connect the motor 35 to a D.-C. source 61 for forward and reverse operation respectively.

In operation the magnitude of the counter output increases with frequency, and hence with altitude. The D.-C. control voltage derived from the voltage divider 43 through the contacts 47 and 49 and the potentiometer 51 is opposed to the output of the counter 37. The control voltage is adjusted, by moving the contacts 47 and 49, to a magnitude equal to that produced by the counter at the selected altitude. The movable contact of the relay 55 is actuated to its upper or lower position depending on whether the counter output is less or greater than the control voltage, energizing the motor 35 to move the pulley 30, displacing the contact 9 from the level flight position, and causing the airplane to ascend or descend.

The motor 35 also moves the contact arm 53 of the potentiometer 51, changing the control voltage applied to the altitude limit relay circuit and thus changing the altitude to which the airplane tends to fly. The lever 33 and the potentiometer 53 are normally centered. When the airplane departs from the selected level, the relay 55 operates to start the motor 35 moving to change the position of the pulley 30. This moves the contact 9 with respect to the gimbal ring 7, operating the motor 13 to change the flight attitude so as to return the airplane to the selected level. Motion of the motor 35 also moves the arm of the potentiometer 51, changing the control voltage to a value corresponding to an altitude between the selected altitude and the present altitude. As the airplane leaves this intermediate altitude, the relay 55 is operated to reverse the motor 35, returning the potentiometer arm and the contact 9 to their normal centered positions. The mechanical control ratios between the motor 35, the pulley 30 and the potentiometer arm 53 are such that the contact 9 is centered when the craft reaches the selected altitude.

This arrangement is necessary in order to prevent the airplane from approaching the selected altitude in a climbing or diving attitude and overshooting the proper altitude.

Thus the invention has been described as a system for controlling the flight of an aircraft whereby it maintains a selected altitude. The longitudinal gyroscope of an automatic pilot or bombing stabilizer is biased in response to an altimeter so as to change the flight attitude upon departure from a selected altitude, causing the airplane to ascend or descend to its desired level. Follow-up means are provided to reduce the rate of ascent or descent as the airplane approaches the selected altitude, so as to prevent overshooting or hunting. One embodiment of the invention has been described, employing a radio altimeter of the frequency modulation type arranged to control a motor coupled to the follow-up connection of the longitudinal gyroscope of the automatic pilot. Although the invention has been described with reference to specific types of automatic pilot and altimeter, it is to be understood that other known automatic pilots and altimeters may be substituted.

We claim as our invention:

1. A system for controlling an aircraft at a selected altitude including an altimeter, means for deriving, in response to said altimeter, a unidirectional voltage having a magnitude which is a predetermined function of the altitude of said aircraft, an auxiliary source of unidirectional voltage, manually operable selector means connected to said source to derive therefrom two voltages corresponding in their magnitudes to altitudes respectively above and below said selected altitude, voltage divider means connected to said selector means and provided with a movable contact whereby the voltage at said contact is of a value intermediate said two voltages, relay means differentially responsive to said voltage of intermediate value and said altitude-responsive unidirectional voltage, automatic control means for maintaining said craft in the attitude of level flight, a motor connected to said control means and to said relay to bias said control means in response to the operation of said relay, and a mechanical connection between said motor and the movable element of said voltage divider means, whereby said bias is reduced to zero as said craft approaches said selected altitude.

2. A system for controlling aircraft at a selected altitude including means responsive to the deviation of said craft from said altitude for varying the attitude of said craft, said means including a manually settable device for determining said selected altitude, and means responsive to said deviation for superimposing on the effect of manually settable control device a bias having a magnitude which is a predetermined function of said deviation, whereby said attitude approaches the attitude of level flight as said craft approaches said selected altitude.

3. A control system for aircraft comprising an attitude control including a pitch gyroscope, servo means controlled by said gyroscope and connected to an elevator control surface of said craft, means for applying a variable bias to said servo means to vary the attitude of said craft, an altimeter, a motor arranged to be controlled by said altimeter, mechanical connections between said motor and said bias control means to superimpose on said bias an addtional bias having a magnitude which is a predetermined function of the angular position of said motor, and means responsive to the angular position of said motor to superimpose upon the effect of said altimeter an additional effect related in magnitude to the angular position of said motor.

4. A control system for aircraft comprising an attitude control including a pitch gyroscope, a motor connected to an elevator control surface of said craft, means for controlling said motor by said gyroscope, means for applying a bias to said motor control means, means for controlling said bias to vary the altitude of said craft, an altimeter, a switch controlled by said altimeter and connected to a second motor, and mechanical connections between said second motor and said bias control means arranged to superimpose on said bias an additional bias having a magnitude which is a predetermined function of the angular position of said second motor.

5. A system for controlling aircraft comprising a motor connected to the elevator control surface of said craft, a switch connected in the power input circuit of said motor, a gyroscope connected to said switch so as to cause said motor to operate said control surface to maintain said craft in a predetermined attitude with respect to the axis of rotation of said gyroscope; means for biasing said switch comprising a relay, an altimeter arranged to operate said relay in response to deviations in the altitude of said craft from a selected value, a second motor connected to said relay, and a mechanical connection between said second motor and said switch.

6. A system for controlling aircraft comprising a motor connected to the elevator control surface of said craft, a switch connected in the power input circuit of said motor, a gyroscope connected to said switch so as to cause said motor to operate said control surface to maintain said craft in a predetermined attitude with respect to the axis of rotation of said gyroscope; means for biasing said switch comprising a relay, an altimeter arranged to operate said relay in response to deviations in the altitude of said craft from a selected value, a second motor connected to said relay, a mechanical connection between said second motor and said switch, and means for biasing said relay in response to the angular position of said second motor.

7. A system for controlling an aircraft to fly at a selected altitude, comprising means responsive to deviation of said craft from said altitude to vary the longitudinal attitude of said craft from the attitude of level flight to reduce said deviation; means to cause said craft to return to said selected altitude and supervisory means responsive to the reduction of said deviation from said selected altitude to reduce said variation in attitude to cause said craft to return to said selected altitude in substantially the attitude of level flight.

ROYDEN C. SANDERS, Jr.
JOHN H. PURL.

REFERENCES CITED

The following references are of record in the file of this patent:

UNITED STATES PATENTS

| Number | Name | Date |
| --- | --- | --- |
| 1,709,457 | Boykow | Apr. 16, 1929 |
| 1,997,412 | Fischel | Apr. 9, 1935 |
| 2,188,834 | Fischel et al. | Jan. 30, 1940 |
| 2,210,916 | Kenyon et al. | Aug. 13, 1940 |
| 2,257,203 | Thacker | Sept. 30, 1941 |
| 2,293,889 | DeFlorez | Aug. 25, 1942 |
| 2,340,524 | Fischel et al. | Feb. 1, 1944 |